United States Patent

[11] 3,601,194

[72] Inventor Julius P. Gallus
 Anaheim, Calif.
[21] Appl. No. 841,522
[22] Filed July 14, 1969
[45] Patented Aug. 24, 1971
[73] Assignee Union Oil Company of California
 Los Angeles, Calif.
 Continuation-in-part of application Ser. No. 511,374, Dec. 3, 1965, now Patent No. 3,455,390, dated July 15, 1969.

[54] LOW FLUID LOSS WELL-TREATING COMPOSITION AND METHOD
 23 Claims, 8 Drawing Figs.
[52] U.S. Cl. .................................................... 166/283,
 166/282, 175/65, 252/8.55 A, 252/8.5 C
[51] Int. Cl. .................................................... E21b 43/26,
 E21b 43/27
[50] Field of Search .................................... 166/281-283,
 294, 295, 307, 308; 252/8.55 A, 8.5
 C, 311, 311.5; 175/72, 65; 61/36; 260/28.5, 28,
 29.6; 106/31, 271

[56] References Cited
UNITED STATES PATENTS

| | | | |
|---|---|---|---|
| 2,993,800 | 7/1961 | Pickell.......................... | 106/271 |
| 3,108,441 | 10/1963 | Watson ........................ | 61/36 |
| 3,302,719 | 2/1967 | Fischer......................... | 166/281 X |
| 3,316,965 | 5/1967 | Watanabe .................... | 166/281 X |
| 3,323,589 | 6/1967 | Harvey......................... | 166/274 |
| 3,354,180 | 11/1967 | Ekiss et al..................... | 106/271 X |
| 3,370,650 | 2/1968 | Watanabe .................... | 166/283 X |
| 3,431,976 | 3/1969 | Harvey et al.................. | 166/274 |
| 3,455,390 | 7/1969 | Gallus .......................... | 166/295 |
| 3,477,512 | 11/1969 | Siegele ......................... | 166/283 |
| 3,497,365 | 2/1970 | Atherton et al............... | 106/271 |

*Primary Examiner*—Stephen J. Novosad
*Attorneys*—Milton W. Lee, Richard C. Hartman, Lannas S. Henderson, Robert E. Strauss and Dean Sandford ABSTRACT: A low loss well-treating composition comprising an aqueous mixture of solid wax or wax-polymer particles and a surfactant specifically selected for its ameliorating effect upon the low fluid loss properties of the solid particles, and a process employing this composition in well drilling and treating.

INVENTOR.
JULIUS P. GALLUS

LOW FLUID LOSS WELL-TREATING COMPOSITION AND METHOD

This application is a continuation-in-part of application Ser. No. 511,374, filed Dec. 3, 1965, which matured into U.S. Pat. No. 3,455,390, issued July 15, 1969.

This invention relates to the treating of subterranean formations penetrated by a well, and more particularly to methods for treating permeable subterranean formations employing a special low loss fluid. In other aspects, the invention relates to improved low loss fluid compositions useful in the treatment of oil and gas wells. The method and compositions of this invention have particular application in hydraulic fracturing of subterranean formations, in well-treating processes wherein a treating fluid is injected through a well and into a formation penetrated by the well, and to the completion of wells drilled into oil-bearing producing permeable formations.

In various well-treating operations, such as for example, in the drilling of wells into subterranean earth formations, in the completion of wells in permeable hydrocarbon-producing zones, and in stimulating the recovery of oil and gas from these producing zones, it is often advantageous to inject a fluid into the well in such manner that the fluid is in contact with the earth formations penetrated by the well. Drilling muds, completion fluids, fracturing fluids, acids, and other well-treating liquids injected into the well bore preferentially flow into zones of high permeability, called thief zones, not only resulting in loss and waste of the fluid, but also preventing the injected fluid from entering into zones of lower permeability in substantial quantities, or at least causing poor distribution between zones of different permeability. The loss of treating fluid to the formation is increased at the elevated injection pressures employed in many well-treating operations.

Fluid loss to permeable zones is particularly troublesome in hydraulic fracturing. Conventionally, fracture planes or cleavages extending from the well bore into the formation are formed by subjecting the formation to elevated fluid pressure. Hydraulic pressure is developed by pumping a fluid down the well and into contact with the underground formation to be fractured. Since most formations are to some degree permeable, a portion of the injected fluid will pass from the well into the formation. The fracturing fluid must be injected into the well at a volume flow rate exceeding the rate of fluid loss into the formation in order that the pressure exerted upon the formation by the fracturing fluid will be increased as the fluid is injected. Fluid injection must be continued in this manner until the pressure of the fluid at the fracturing zone is increased sufficiently to overcome the tensile strength of the formation and the weight of the overburden, thereby effecting an initial separation of the earth formation at a point of minimum strength. Upon forming the initial fracture, fluid injection is continued to extend the fracture into the formation. Since the formation face contacted by the fracturing fluid is increased as the newly formed fractures are extended into the formation, fluid loss to the formation also increases, particularly where additional permeable zones are opened by the fracture. Although higher fluid injection rates are required to further extend the fracture planes into the formation, fluid availability is decreased because of increased loss to the formation.

Where one or more highly permeable zones are in communication with the well and receiving the fracturing fluid, it is sometimes impractical to inject fluid at sufficiently high volume flow rates to effect the necessary pressure buildup because of the large loss of fluid to these permeable zones. In other cases, fracturing can only be effected by the injection of large quantities of fracturing fluid requiring a number of injection pumps. Such fracture jobs are expensive, not only because of the additional equipment required, but also because of the high energy consumption in the useless injection of fluid into the formation. More importantly, since the areal extent of the fracture plane is generally increased by higher volume injection rates into the actual fracture, loss of fluid to permeable zones of the formation results in less fracturing fluid being available to extend the fracture. Thus, fluid loss is not only costly, but it can result in inferior fracturing and ultimately in decreased oil recovery.

Various techniques have been proposed to reduce the loss of well-treating fluids to the formation. For example, the penetration of treating fluid into the formation can be decreased by adding thickening or gelling agents to alter the viscosity characteristic of the fluid. Napalm-type gelling agents are conventionally employed with hydrocarbon base fluids. Among the various substances which have been proposed as bodying agents for aqueous treating fluids are gums, such as guar, traganth, talha, damas, karaya, and batu; colloidal substances such as starch, dextrin, Irish moss and silica flour; and various water-soluble polymers such as polyacrylates and polyacrylamides. While bodied fluids are rendered less susceptible to fluid loss, high injection pressures are generally required because of increased pressure drop through flow conduits. Particularly in the case of hydraulic fracturing, injection pressures are often limited by the pressure rating of wellhead equipment, casings and tubing strings. The increased pressure drop results in reduced hydraulic pressure in the fracturing zone. Further, on completion of the treating job, the thickened fluid must be removed from oil-producing zones to restore permeability. Although gel-breaking fluids can be injected for this purpose, destruction of the gel is only partially complete resulting in some permanent loss of permeability.

Alternatively, it has been proposed to add to the treating fluid substances which do not have a pronounced effect on the properties of the fluid, but act instead to form a mat or deposit on the formation face, or which enter into the small flow channels or interstices of the formation rendering the formation more or less impermeable to the treating fluid. Suggested materials include fibrous or finely divided, substantially oil and water insoluble solid material capable of suspension in the treating fluid, such as shredded or granular particles of asbestos, mica, plastic, cotton fibers, cellophane and chopped rope. Other materials employed as fluid loss additives include finely divided, insoluble minerals and salts. A well-known commercial fluid loss additive employs a mixture of finely divided, relatively insoluble sulfonate salt and alkaline earth metal carbonate, e.g., mixture of calcium sulfonate and calcium carbonate. However, even through the foregoing materials are more or less effective in reducing the loss of fluid to the formation, they commonly have the undesirable effect of permanently reducing the formation permeability, thus adversely affecting the ultimate recovery of oil from the producing zone. Similarly, less permanent fluid loss additives, such as particles of ice and asphalt emulsions, have not been generally satisfactory.

An improved method for treating permeable subterranean formations has been disclosed in parent application Ser. No. 511,374, now U.S. Pat. No. 3,455,390. In that method, small oil-soluble, water-insoluble wax or wax-polymer particles are dispersed in an aqueous treating fluid. The dispersed solids are deposited in the formation during the well-treating process so as to render the formation less permeable to the treating fluid. The particulate matter is specifically selected to be slowly soluble in the reservoir hydrocarbons. Thus, the matter deposited in the oil-producing zones during the treating process is dissolved or at least solubilized to the extent that they are removed from these zones by the formation hydrocarbons on return of the well to production, with substantially no permanent loss of formation permeability.

The discrete wax and wax-polymer particles are highly successful as diverting agents and in many other well-treating applications, and to some extent effect a reduction in the loss of fluid to the formation. However, in certain fracturing, well-drilling, completion and well-treating operations, it is desirable to reduce the loss of fluid to the formation to a value heretofore unobtainable with wax or wax-polymer particles, yet without incorporating fluid loss control agents that cause permanent permeability reduction, or which otherwise damage the formation.

Accordingly, it is an object of the present invention to provide an improved well-treating process for temporarily plugging a permeable subterranean formation to prevent or retard the flow of fluids therethrough. Another object is to provide a well-treating process employing a low loss fluid composition which does not cause permanent loss of formation permeability. Another object is to provide an improved method for hydraulically fracturing permeable formations. Still another object is to provide a process for fracturing permeable formations wherein the loss of fracturing fluid to the formation is reduced. A further object is to provide a well-treating composition having the property of reduced fluid loss to the formation. A still further object is to improve the fluid loss properties of aqueous dispersions of solid wax and wax-polymer particles. Other objects and advantages of the invention will be apparent to those skilled in the art from the description thereof which follows.

The foregoing objects and their attendant advantages can be realized with a low loss fluid comprising a dispersion of oil-soluble, water-insoluble solid wax of wax-polymer particles in an aqueous liquid containing a surface active agent selected for its ameliorating effect upon the fluid loss properties of the aqueous dispersion. These surface active agents, in combination with the solid wax or wax-polymer particles, cooperate to reduce the fluid loss of the aqueous dispersion below that obtainable with the solid wax or wax-polymer particles alone, yet do not permanently affect the permeability of the oil-bearing strata of the formation.

The oil-soluble, water-insoluble solid wax or wax-polymer particles are solid particles of an oil-soluble petroleum wax, or homogeneous solid solutions of petroleum wax and a polymer selected to exhibit a controlled, slow solubility in the reservoir oil, and are insoluble in water, acid and brine. Solid particulate matter exhibiting these properties can be dispersed in an aqueous carrier liquid without being dissolved therein; thus, the solid agent retains its particulate form while dispersed in the aqueous liquid, and further, the properties of the aqueous medium are not altered by dissolution of the solid material.

On injection into the well, the dispersion tends to penetrate into the formation to a greater or lesser extent along all of the formation face exposed to the fluid. The quantity of fluid entering into the formation and the depth of penetration is dependent in part on the porosity and permeability of the structure. As the dispersion passes into the formation, some of the solids may be filtered from the carrier liquid so as to form a mat of solid particles on the face of the formation tending to prevent further penetration of fluid into the formation. However, in most zones having a more open structure, dispersed solids are carried into the formation with the carrier liquid to be deposited in the pores, and to therein form intersticial plugs preventing or retarding the flow of fluid into the formation. Since the dispersion has greater tendency to enter into the more permeable zones, these zones will be preferentially plugged so as to result in a partially plugged formation of more or less uniform permeability. The flow of fluid into the formation rapidly decreases as the plug is established, the total quantity of fluid lost to the formation, being controlled, in part, by the quantity of additive material employed. Thus, the loss of carrier fluid to the formation at the face of the well and along fracture faces extending into the formation is minimized by the combination of a mat of solid particles formed on the formation face and by intersticial plugging within the formation.

It is desired that the oil solubility of the wax or wax-polymer particles be such that upon their placement in the formation, or upon the face of the formation, they will remain as solids for a time period sufficient to perform a particular well operation, but will be slowly dissolved in the oil, or at least solubilized to the extent that they are removed from the oil-producing zones on return of the well to production. Thus, the wax or wax-polymer particles function as plugging agents effective in reducing the permeability of the formation for a limited time period, such as from a few hours to several days, depending upon the solubility or dispersibility of the particles in the reservoir oil. Further, since the particles are substantially insoluble in connate water and brine, plugs established in water-producing zones, in which oil is not present to function as a solvent, will be largely permanent resulting in selective water shutoff.

The solid oil-soluble, water-insoluble plugging agents that can be used in the practice of this invention can be solid particles of petroleum wax, such as crystalline and microcrystalline paraffin waxes melting between about 130° F. and about 165° F. The wax component is selected for its solubility in the reservoir oil, and preferably has a melting point above the injection temperature, and more preferably above the reservoir temperature, although in some treating applications, sufficient cooling is obtained by the injection of the aqueous fluid to permit the use of solid particles comprised of waxes melting somewhat below the reservoir temperature.

A superior fluid loss additive for dispersion in an aqueous carrier liquid can be formed from particulated homogeneous solid solutions of wax and (1) an addition polymer of an olefin having between 2 and 4 carbon atoms, (2) copolymers of an olefin having between 2 and 4 carbon atoms and an alkyl acrylate containing not more than 4 carbon atoms in the alkyl group, (3) copolymers of an olefin having between 2 and 4 carbon atoms and an ester formed by the reaction of butenic acid and an alcohol having no more than 4 carbon atoms, and (4) copolymers of olefins having between 2 and 4 carbon atoms and an ester formed by the reaction of acetic acid and an unsaturated alcohol having no more than 4 carbon atoms.

Preferred polymer component materials include polyethylene, polypropylene, polybutylene, copolymers of ethylene and vinyl acetate, copolymers of ethylene and methyl methacrylate, and copolymers of ethylene and ethylacrylate. A single polymer component selected from the above classes of polymeric components may be employed, or two or more such material can be combined. Each of the aforesaid polymer components will impart somewhat different properties of strength, ductility, solubility, melting point, density, and dispersibility to the final solid composition. Desired properties not obtainable with a single polymeric material can often be achieved with blends of two or more of these polymers, or by the addition of other polymers and resins to the composition.

A number of wax-polymer particle compositions and methods of producing these particles are disclosed in U.S. Pat. Nos. 3,302,719 and 3,316,965.

The solid wax and wax-polymer particles used in the practice of this invention vary widely in size and shape. Typically, these particles can be spheroids, cubes, granules, buttons, flat disks, or mixtures thereof, having mean diameters in the range of from about one-half inch to about 1 micron and less. More particularly, the particles can be cubes, buttons or disks having a size in the range of from about one-quarter inch to about one-half inch, spheroids or granules in the size range of from about 4 to 200 mesh U.S. sieve, or particles having a mean diameter from about 1 to about 50 microns.

The particular solid particle content required usually depends upon the characteristics of the formation and the degree of fluid shutoff desired, with additive contents within the range of about 0.1 to about 60 weight percent being generally satisfactory in most operations. In hydraulic fracturing, where a fairly high degree of fluid shutoff is desirable, additive contents above about 10 weight percent, and preferably within the range of about 10 to 40 weight percent are preferred. In other treating applications, such as for example in acidizing, where only partial plugging to effect more uniform distribution of the injected fluid throughout zones of varying permeability is desired, lower additive contents are preferred, and particularly additive contents of less than 10 weight percent.

The fluid loss properties of aqueous fluids containing the above-described oil-soluble, water-insoluble wax or wax-polymer particles are substantially enhanced by incorporating therein a selected surface active agent that synergistically cooperates with the dispersed solid particles to reduce fluid loss. It is well known that most surface active agents improve the dispersibility of water-repelling (hydrophobic) particles in aqueous liquids. However, surface active agents that provide good dispersibility do not necessarily provide good fluid loss properties, and in fact, some surfactants which produce a superior particle dispersion may have relatively little effect on fluid loss.

Surface active agents that synergistically cooperate with the solid wax or wax-polymer particles are nonionic surface active ethers, polyethers and thioethers having an HLB factor between about 8.5 and 19.5, nonionic surface active esters having an HLB factor between about 10 and 14.5, nonionic surface active amides having an HLB factor between about 7 and 10.5, nonionic surface amines having an HLB factor between about 4 and 10, anionic surface active sulfonates having an AFL factor between about 7 and 12.5, anionic surface active organo-sulfates having an AFL factor between about 5.5 and 7.5, anionic surface active organo-phosphates having an AFL factor between about 12 and 39, and cationic surfactants having a CFL factor between about 19 and 38.

The term "HLB factor" stands for hydrophile-lipophile balance, and is a measure of the hydrophilic (water-loving) and lipophilic (oil-loving) nature of a surfactant. The HLB factor has an arbitrary scale of 0 to 20, with a value of 0 representing a completely lipophilic substance e.g. oil, and a value of 20 representing a completely hydrophilic substance, e.g. water. The HLB factor for a particular surfactant can be obtained experimentally by conventional means, although such methods are often arduous and time consuming. An approximate HLB factor can be predicted from the molecular structure of the surfactant in accordance with the following relationship:

$$HLB = (H/H+L) \times 20$$

wherein $H$ is the molecular weight of the hydrophilic part of the molecule; and
$L$ is the molecular weight of the lipophilic part of the molecule.

The term "AFL factor" stands for anionic fluid loss factor, and is a parameter based on the chemical composition of the surfactant and its resulting ions in accordance with the following relationship:

$$AFL = \frac{C_{an} - [O_t + N_t + 2C_{cat} + S_t + 2B_t]}{I_{an}}$$

wherein $C_{an}$ = total number of carbon atoms in the anionic portion of the molecule;
$O_t$ = total number of oxygen atoms in the entire molecule;
$N_t$ = total number of nitrogen atoms in the entire molecule;
$C_{cat}$ = total number of carbon atoms in the cationic portion of the molecule;
$S_t$ = total number of sulfur atoms in the entire molecule;
$B_t$ = total number of benzene rings in the entire molecule; and
$I_{an}$ = total number of anions formed on the complete ionization of the molecule.

The term "CFL factor" stands for cationic fluid loss factor and is a parameter based on the chemical composition of the surfactant and it resulting anions in accordance with the following relationship:

$$CFL = \frac{C_{cat} - [O_t + N_t + S_t + 2C_{an} - 2X]}{I_{cat}}$$

wherein
$C_{cat}$ = total number of carbon atoms in the cationic portion of the molecule;
$O_t$ = total number of oxygen atoms in the entire molecule;
$N_t$ = total number of nitrogen atoms in the entire molecule;
$S_t$ = total number of sulfur atoms in the entire molecule;
$C_{an}$ = total number of carbon atoms present in the anionic portion of the molecule;
$X$ = total number of halogen atoms in the entire molecule; and
$I_{cat}$ = total number of cations formed on the complete ionization of the molecule.

Nonionic surface active agents that synergistically cooperate with the solid wax and wax-polymer particles in aqueous solution to provide a low loss fluid are ethers, polyethers, and thioethers having HLB factors between about 8.5 and 19.5, and preferably between about 13 and 19, characterized by the following generalized formulas $$R-O-R_1,$$

$$HO(C_2H_4O)_a(C_3H_6O)_b(c_2H_4O)_cH, \text{ and}$$

$$R-S-R_1;$$

esters having HLB factors between about 10 and 14.5, and preferably between about 11.5 and 14, characterized by the following generalized formula

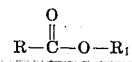

amides having HLB factors between about 7 and 10.5, and preferably between about 7.5 and 10, characterized by the following generalized formulas

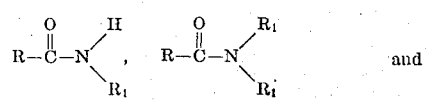

and amines having HLB factors between about 4 and 10, preferably between about 4.5 and 9, characterized the following formulas

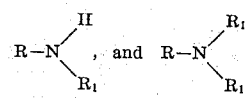

wherein R is a lipophilic organic group containing from about 6 to about 35 carbon atoms, exemplary of which are alkyl groups, such as hexyl, heptyl, octyl, nonyl, decyl, hendecyl, dodecyl, tridecyl, tetradecyl, pentadecyl, hexadecyl, heptadecyl, octadecyl, nonadecyl, etc.; animal fats, vegetable oil and fatty acid derivatives, such as derivatives of linseed oil, soybean oil, tung oil, palm oil, coconut oil, whale oil, peanut oil, olive oil, cottonseed oil, tail oil, etc.; alkylaryl groups such as hexylphenyl, heptylphenyl, octylphenyl, nonylphenyl, decylphenyl, alkenyl, cycloalkyl, alkynaphthyl, anthryl and alkylanthryl groups; and rosin compounds; and wherein $R_1$ is a hydrophilic organic group containing from about 1 to 4 carbon atoms, exemplary of which are carboxy and alkyl derivatives thereof, such as carboxymethyl, carboxyethyl, etc.; amido and alkyl derivatives thereof, such as amidomethyl, amidoethyl, etc.; aminoalkyls, such as aminomethyl, aminoethyl, aminoprophyl, etc.; hydroxyalkyls, such as hydroxymethyl, hydroxyethyl, hydroxypropyl, hydroxyisopropyl, etc.; alkoxy and imidoalkyl groups; and polyfunctional organic groups such as polyethers, polyesters, polyhydric alcohols and polyamines containing from about 4 to about 200 carbon atoms where each functional group is separated by 1, 2 or 3 carbon atoms; and wherein $a$ and $c$ are integers having a value of from about 3 to 50, and $b$ is an integer having a value of from about 5 to 80.

Anionic surface active agents that synergistically cooperate with the solid wax and wax-polymer particles in aqueous solution to reduce fluid loss are sulfonates having an AFL factor between about 6 and 12.5, and preferably between about 6.5 and 10.5, characterized by the following generalized formula $$MSO_3\text{-}R_2;$$

organo-sulfates having an AFL factor between about 5 and 9, and preferably between about 5.5 and 7.5, characterized by the following generalized formula $$MSO_4\text{-}R_2;$$

organo-phosphates having an AFL factor between about 12 and 39, and preferably between about 15 and 32, characterized by the following generalized formulas

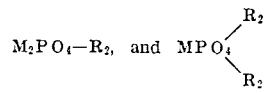

wherein M is a cation, exemplary of which are alkali metals, such as sodium, potassium and lithium; ammonium and substituted ammonium groups such as triethanol amine and triethylamine; and hydrogen; and wherein $R_2$ is a lipophilic organic group containing up to 200 carbon atoms, and usually containing from about 6 to 100 carbon atoms, and which may also contain some hydrophilic functional groups, exemplary of which are alkyl, aryl, alkylaryl, alkenyl, alkenylaryl, alkylamine, alkylpolyamine, alkylester, alkylpolyester, alkylether, alkylpolyether, alkylarylpolyether, cycloalkyl, naphyl, alkylmercaptyl, anthryl and alkylanthryl groups; and animal fat, vegetable oil, fatty acid and rosin derivatives.

Cationic surface active agents that synergistically cooperated with the solid wax and wax-polymer particles in aqueous solution to provide a low loss fluid are substituted ammonium compounds, alkyl-substituted oxazolines, substituted imidazolines, rosin-amines, etc., having CFL factors between about 19 and 38, and preferably between about 22 and 35, some of which are characterized by the following generalized formulas

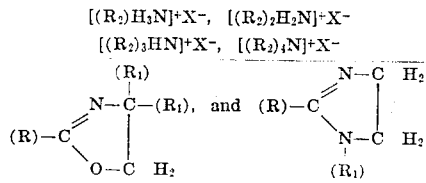

wherein X is an anionic group, exemplary of which are halogens such as chloride, bromide, fluoride, iodide, etc.; organic groups such as formate, acetate, propionate, butyrate, isobutyrate, and benzoate; and wherein R, $R_1$ and $R_2$ are organic groups as defined supra.

Exemplary of the surface active agents that can be employed in the practice of this invention are the commercial surfactants listed in table 1.

Surface-active materials that are particularly preferred agents for use with aqueous dispersions of solid wax and wax-polymer particles to reduce fluid loss are (1) a condensation product of lauric or coconut fatty acid and diethanolamine, exemplary of which are surfactants marketed by the Onyx Chemical Company under the trademark Onyx WW and by the Stepan Chemical Company under the trademark Ninol 737 and Ninol 1281; (2) an octylphenoxy polyethoxy ethanol having a polyothoxy chain containing between about 15 and 35 mole equivalents of ethylene oxide, exemplary of which are surfactants marketed by the Rohm and Haas Company under the trademarks Triton 165 and Triton 305; (3) a condensation product of stearamine or cocoamine and between about 2 and 4 mole equivalents of ethylene oxide, exemplary of which are surfactants marketed by Armour Industrial Chemicals Company under trademarks Ethomeen C/12 and Ethomeen 18/12; (4) a condensation product of coconut fatty acids and between about 4 and 6 mole equivalents of ethylene oxide, exemplary of which is a surfactant marketed by the Armour Industrial Chemical Company under the trademark Ethofat C/15; and (5) dilauryldimethyl ammonium chloride, exemplary of which is a surfactant marketed by the Armour Industrial Chemical Company under the trademark Arquad 2C-75.

While the foregoing surface-active agents in combination with aqueous dispersions of wax and wax-polymer particles cooperate to effectively reduce fluid loss below that obtained with either an aqueous solution of the surface active agent or an aqueous dispersion of solid wax or wax-polymer particles individually, it is recognized that other surface-active materials may also produce this synergistic effect. A relatively simple screening test to determine the effectiveness of a surface-active material can be performed by admixing a measured amount of the surfactant, 5 grams of solid wax or wax-polymer particles, and 500 milliliters of water. One face of a kerosene-saturated cylindrical Berea sandstone test core having a length and a diameter of 1 inch is contacted with the dispersion at a pressure of 500 p.s.i.g., with the other face of the test core being maintained at atmospheric pressure. Fluid exiting from the core is collected and the cumulative volume of combined fluid effluent collected over a 5 minute period measured. The relative fluid loss reduction is determined by comparison of the measured fluid loss with the fluid loss obtained with a surfactant-free, aqueous dispersion of wax or wax-polymer particles.

Although a number of surface active agents may synergistically cooperate with the wax or wax-polymer particles to provide somewhat lower fluid loss than obtained with either the aqueous surfactant solution or the aqueous dispersion of wax or wax-polymer particles individually, only those surface-active agents that reduce the fluid loss to approximately one-half of that obtained with the surfactant-free dispersion of solid wax of solid wax and wax-polymer particles are preferred, and the more preferred surface-active agents are those that reduce fluid loss to approximately one-third of this value.

TABLE 1.—EXEMPLARY COMMERCIAL SURFACTANTS

| Company | Trademark | Surfactant type | Approximate characterization factor |
|---|---|---|---|
| Rohm and Haas | Triton X-35 | Nonionic ether | HLB 8.8 |
| Do | Triton X-45 | do | HLB 11.2 |
| Do | Triton X-165 | do | HLB 15.9 |
| Do | Triton X-305 | do | HLB 17.4 |
| Retzloff Chem. Co | Retzonal NP-100 | do | HLB 13.8 |
| Armour Ind. Chem | Ethofat 0/15 | do | HLB 10.1 |
| Do | Ethofat C/15 | Nonionic ester | HLB 12.4 |
| Atlas Chem. Inc | Span 20 | do | HLB 11.8 |
| Do | Tween 85 | do | HLB 11.2 |
| Armour Ind. Chem | Ethomid 0/15 | Nonionic amide | HLB 10.5 |
| Onyx Chem. Corp | Onyxol WW | do | HLB 9.2 |
| Stepan Chem. Co | Ninol 1281 | do | HLB 8.8 |
| Do | Ninol 737 | do | HLB 9.0 |
| Armour Ind. Chem | Ethomeen C/12 | Nonionic amine | HLB 7.3 |
| Do | Ethomeen T/15 | do | HLB 9.7 |
| Mona Ind | Monawet DC-70 | Anionic sulfonate | AFL 12 |
| E. I. du Pont de Nemours | Dupanol C | do | AFL 7 |
| General Analine and Film | Gafac PE-510 | Anionic phosphate | AFL 36 |
| Do | Gafac MC-470 | do | AFL 20 |
| Nalco Chem | Nalquot G8-13 | Cationic | CFL 24 |
| Do | Nalquot G9-13 | do | CFL 19 |
| Armour Ind. Chem | Arquad 2C-75 | do | CFL 25 |
| Do | Arquad 2HT | do | CFL 35 |
| Do | Ethomeen 18/12 | Nonionic amine | HLB 6.8 |

The concentration of surface active agents employed in the low loss fluids of this invention can vary over a wide range depending upon the dispersibility of the surfactant in the aqueous fluid, and the amount of solid wax or wax-polymer particles dispersed in the fluid. Generally, however, the concentration ranges from about 0.05 to 25 weight percent of surfactant based upon the weight of wax particles, i.e., from about 0.0005 to 0.25 part by weight of surfactant per unit weight of solid particles. A more preferred range of surfactant concentration is between about 0.1 and 15 weight percent of surfactant based upon the weight of the solid wax and wax-polymer particles. It is also preferred that the surfactant concentration increase with decreasing particle size, i.e., as the surface area of the solid particles increases, it is preferred that the surfactant concentration be increased proportionally.

The surfactant and the particulate additive can be admixed with the aqueous carrier liquid at the well site, or alternatively, a concentrated slurry of the solid particles and the surfactant can be prepared and mixed into the carrier liquid. In cases where it is difficult to disperse the surface-active agent in the aqueous liquid, it may be necessary to first heat the carrier liquid to disperse the surfactant prior to adding the solid particles.

The low loss fluid composition of this invention can be effectively employed as a drilling fluid in well drilling, and particularly as a completion fluid in the drilling of oil and gas wells. In this application, the fluid is circulated from the surface to the drilling zone in a subterranean formation during the drilling operation, and at least a portion of the fluid is returned to the surface. The compositions of this invention also have utility as fracturing fluids in the hydraulic fracturing of oil wells, the fracturing fluids being injected under elevated pressure to cause fracturing of the subsurface formation, and in chemical treating, acidizing, and other well-treating operations wherein it is desired to control fluid loss to permeable underground structures.

The invention is further illustrated by the following examples which are illustrative of specific modes of practicing the invention and are not intended as limiting the scope of the invention as defined by the appended claims.

EXAMPLE 1

This example illustrates the calculation of approximate HLB, AFL and CFL factors, respectively, for typical nonionic, anionic and cationic surfactants.

The approximate HLB factor for the nonionic surfactants is calculated as follows:

Exemplary surfactant:

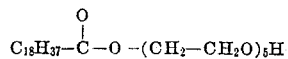

Molecular weight of hydrophilic portion:
Oxygen 7×16 = 112
Carbon 11×12 = 132
Hydrogen 21×1 = 21

Molecular weight = 265

Molecular weight of lipophilic portion:
Carbon 18×12 = 216
Hydrogen 37×1 = 37

Molecular weight = 253

$$HLB = \frac{H}{H+L} \times 20 = \frac{265}{265+253} \times 20 = 10.2$$

The AFL factor for the anionic surfactants is calculated as follows:
Exemplary surfactant:

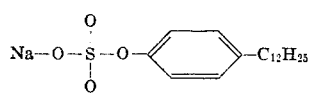

$$AFL = \frac{C_{an} - [O_t + N_t + 2C_{cat} + S_t + 2B_t]}{I_{an}}$$
$$= \frac{18 - [4 + 0 + 2(0) + 1 + 2(1)]}{1}$$

$AFL = 11$

The CFL factor for the cationic surfactant is calculated as follows:
Exemplary surfactant: $[(C_{18}H_{37})_2N(CH_3)_2]^+Cl^-$ $$CFL = \frac{C_{cat} - [O_t + N_t + S_t + 2C_{an} + 2X]}{I_{cat}}$$
$$= \frac{38 - [0 + 1 + 0 + 2(0) + 2(1)]}{1}$$

$CFL = 35$

EXAMPLES 2–51

The effectiveness of various surfactants in improving the fluid loss properties of solid wax-polymer particles is demonstrated by a series of fluid loss tests. In each test, a standard test core is contacted under standard conditions of temperature and pressure with an aqueous fluid dispersion containing the same proportion of solid wax-polymer particle and the same surfactant concentration, and the volume of fluid passing through the core is measured. A different surfactant is employed in each of the tests, and the volume of fluid passing through the cores in a fixed time period is indicative of the fluid loss properties of the various dispersions.

The aqueous dispersions are prepared by admixing 5 grams of wax-polymer particles having a mean diameter less than 50 microns with 500 milliliters of water and 0.25 gram of surfactant. The particles employed in this example are homogeneous solid solutions of 90 weight percent paraffin wax having a melting point of 165° F. and 10 weight percent ethylene-ethylacrylate copolymer marketed by the Dow Chemical Company under the trademark Zetafax 1075. It is sometimes necessary to first disperse the surfactant in the water prior to the addition of the hydrocarbon-polymer particles, and may require heating the initial aqueous solution to dissolve the surfactant. The dispersion is stirred at high speed for 5 minutes prior to being transferred to the test core apparatus, and is also stirred throughout the fluid loss test.

The test cores are cylinders of Berea sandstone, 1 inch in diameter by 1 inch in length. The cores are mounted in standard brass core holders so that one flat end face of the cylinder can be contacted with the aqueous dispersion under 500 p.s.i.g. pressure, with the other face of the cylinder being maintained at atmospheric pressure. Thus, the test core is subjected to 500 differential pressure tending to drive the fluid through the core. The test cores are prepared by saturating them with tapwater and then displacing this water with kerosene. Aqueous fluid flowing through the core displaces the kerosene, and the combined fluid is collected. The tests are conducted at room temperature (78° F.).

The cumulative volume of combined fluid effluent collected over a 5 minute period is measured and reported in table 3. An approximate surfactant characterization factor is also indicated for each of the surfactants.

The cumulative fluid loss of the aqueous dispersions tested in examples 2–51 are illustrated in the drawings, of which:

TABLE 2.—FLUID LOSS THROUGH PERMEABLE CORES

Figure 1:
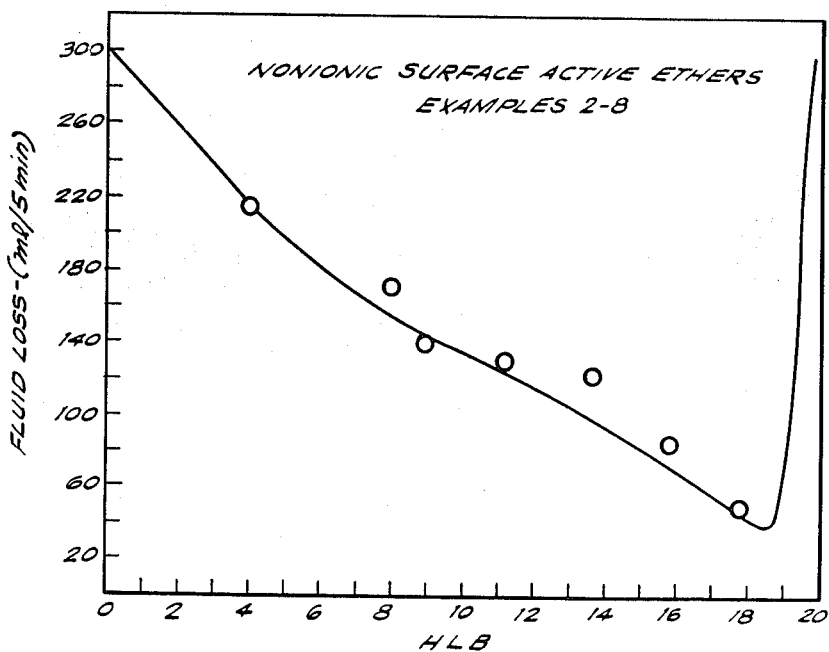
FIG. 1 is a plot of the cumulative fluid loss for the aqueous dispersions containing various nonionic surface-active ethers tested in examples 2–8 as a function of the HLB factor of the surfactant.
Figure 2:
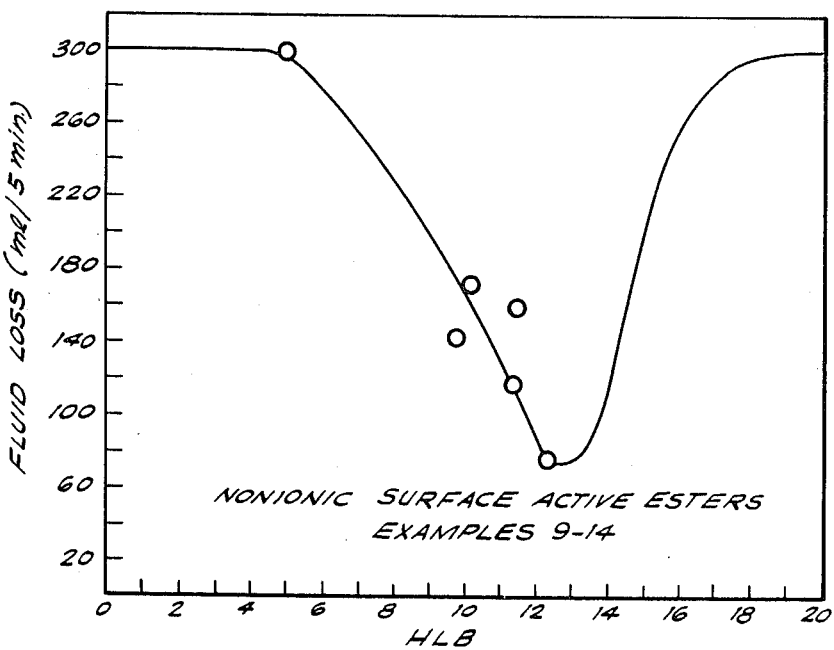
FIG. 2 is a plot of the cumulative fluid loss for the aqueous dispersions containing various nonionic surface-active esters tested in examples 9–14 as a function of the HLB factor of the surfactant.
Figure 3:
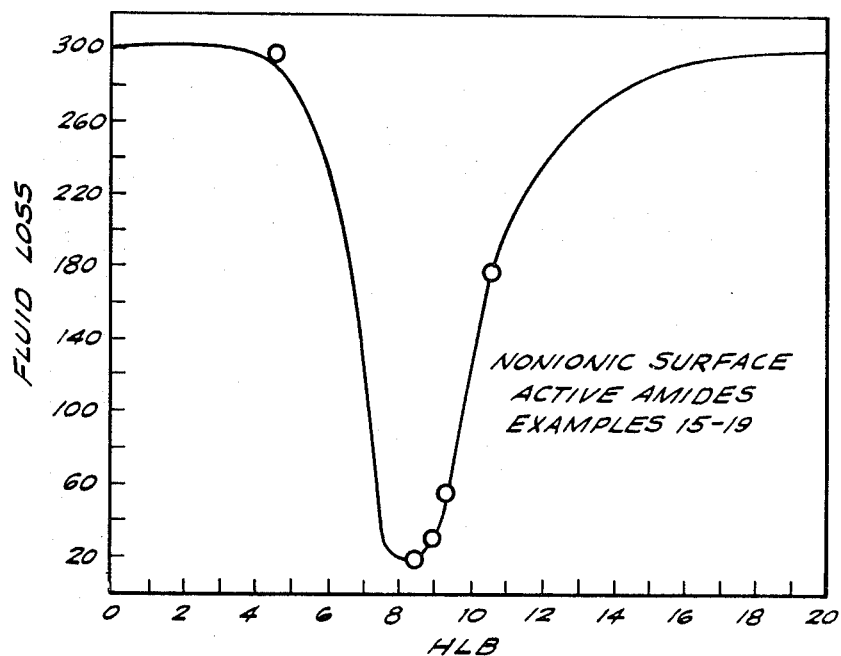
FIG. 3 is a plot of the cumulative fluid loss for the aqueous dispersions containing various nonionic surface-active amides tested in examples 15–19 as a function of the HLB factor of the surfactant.
Figure 4:
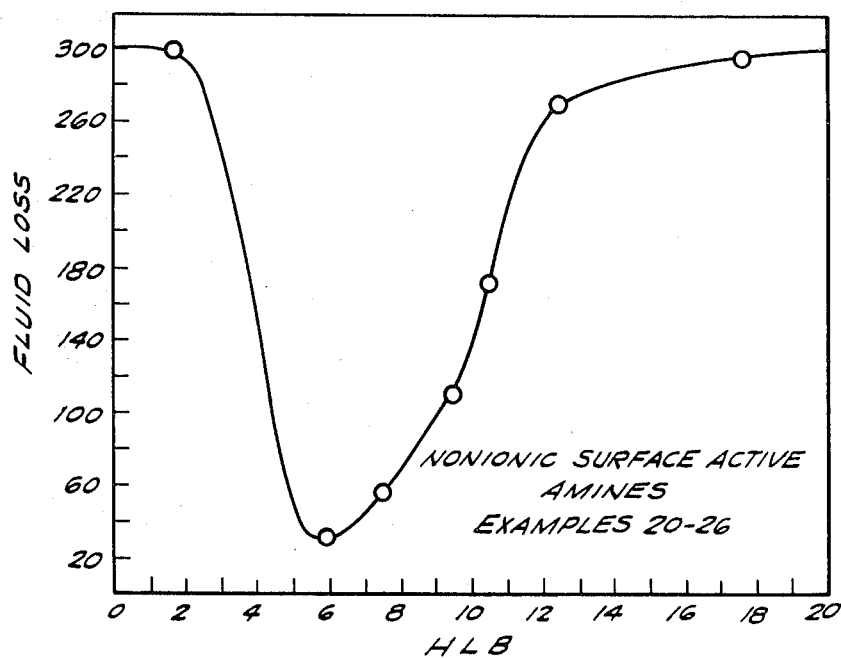
FIG. 4 is a plot of the cumulative fluid loss for the aqueous dispersions containing various nonionic surface-active amines tested in examples 20–26 as a function of the HLB factor of the surfactant.
Figure 5:
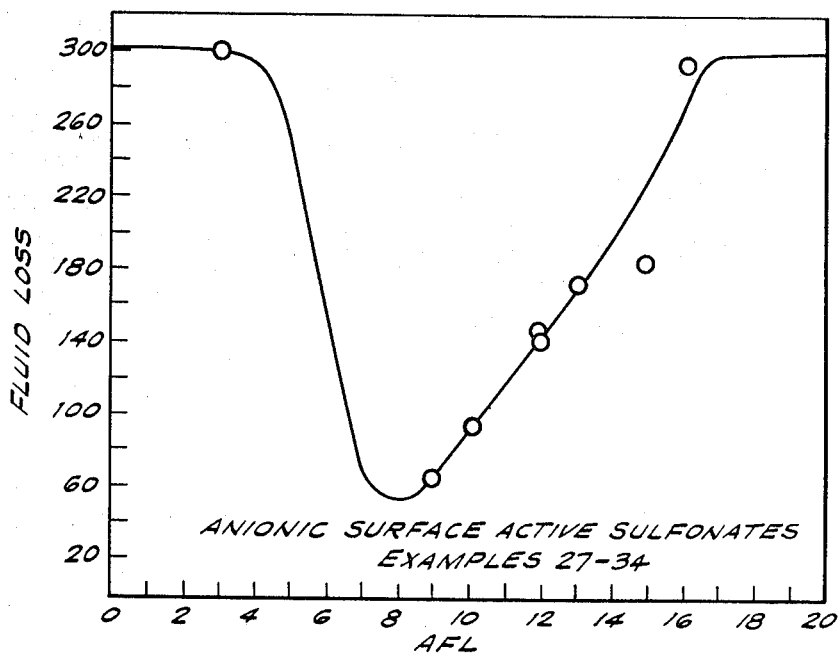
FIG. 5 is a plot of the cumulative fluid loss for the aqueous dispersions containing various anionic surface active sul-
Figure 6:
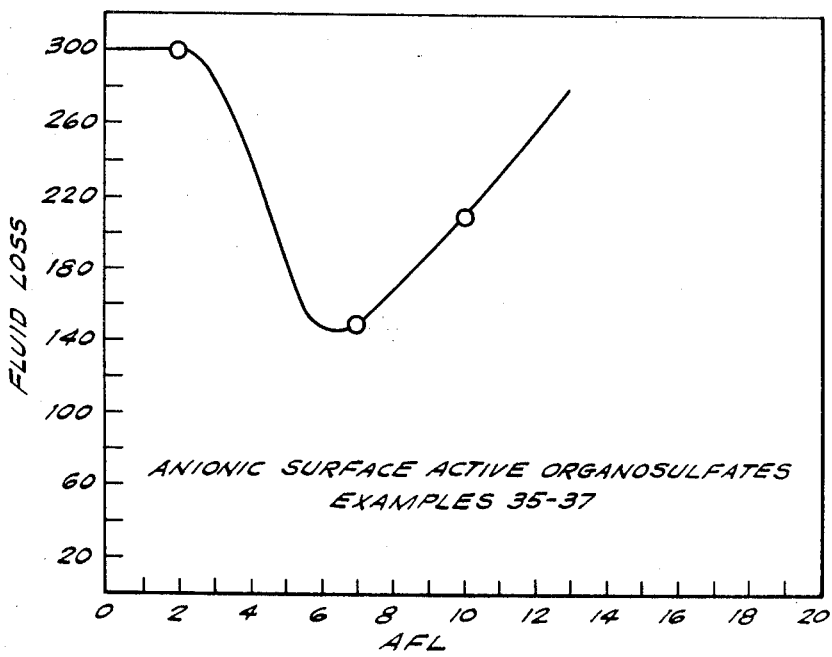
Figure 7:
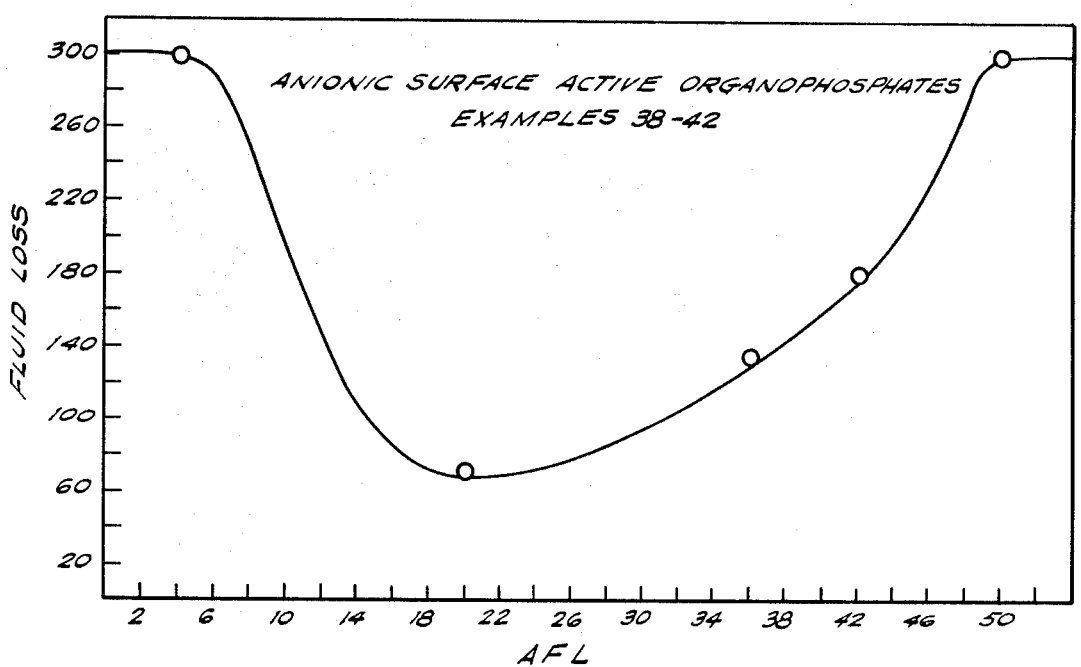
Figure 8:
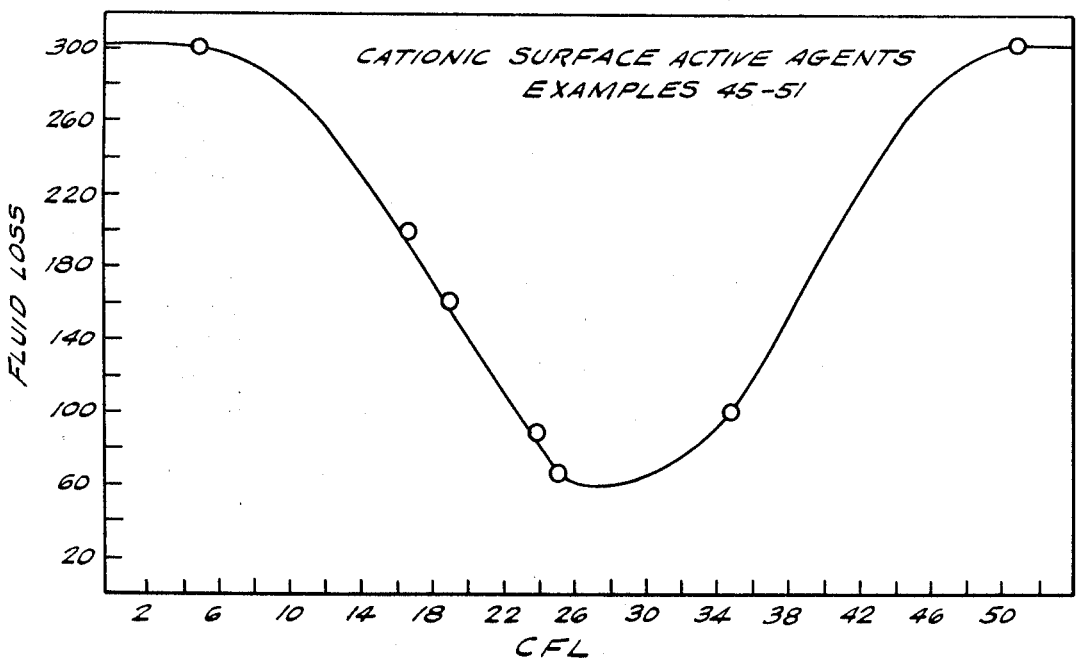

| Example | Surfactant — Company | Surfactant — Trade name | Surfactant — Chemical | Characterization factors (Approximate) — HLB | AFL | CFL | Fluid loss (ml./5 min.) |
|---|---|---|---|---|---|---|---|
| NONIONIC ETHERS | | | | | | | |
| 2 | Wyandotte Chem. Corp | Pluronic L/62 | Polyoxyethylene, polyoxypropylene. | 4 | | | 215 |
| 3 | do | Pluronic L/64 | do | 8 | | | 170 |
| 4 | Rohm and Haas | Triton X-35 | Octylphenoxy, polyoxyethylene ethanol. | 8.8 | | | 135 |
| 5 | do | Triton X-45 | do | 11.2 | | | 130 |
| 6 | do | Triton X-165 | do | 15.9 | | | 85 |
| 7 | do | Triton X-305 | do | 17.4 | | | 52 |
| 8 | Retzloff Chem | Retzonal NP-100 | Alkylphenoxy, polyoxyethylene ethanol. | 13.8 | | | 125 |
| NONIONIC ESTERS | | | | | | | |
| 9 | Armour Ind. Chem | Ethofat 0/15 | Polyethoxylated fatty acids | 10.1 | | | 175 |
| 10 | do | Ethofat C/15 | do | 12.4 | | | 76 |
| 11 | Atlas Chem. Ind | Span 20 | Sorbitan monolaurate | 11.8 | | | 160 |
| 12 | do | Span 60 | Sorbitan monostearate | 9.7 | | | 140 |
| 13 | do | Tween 85 | Polyoxyethylene sorbitan trioleate. | 11.2 | | | 120 |
| 14 | | | Methyl laurate | 5 | | | 300 |
| NONIONIC AMIDES | | | | | | | |
| 15 | Armour Ind. Chem | Ethomid 0/15 | Polyethoxylated | 10.5 | | | 180 |
| 16 | Onyx Chem. Corp | Onyxol WW | Fatty acid amides | 9.2 | | | 57 |
| 17 | Stepan Chem. Co | Ninol 1281 | do | 8.8 | | | 19 |
| 18 | do | Ninol 737 | do | 9.0 | | | 30 |
| 19 | | | Stearamide | 4.8 | | | 300 |
| NONIONIC AMINES | | | | | | | |
| 20 | Armour Ind. Chem | Ethomeen C/12 | Polyethoxylated amines | 7.3 | | | 57 |
| 21 | do | Ethomeen C/15 | do | 10.5 | | | 170 |
| 22 | do | Ethomeen 18/60 | do | 17.8 | | | 300 |
| 23 | do | Ethomeen 18/20 | do | 12.8 | | | 280 |
| 24 | do | Ethomeen T/15 | do | 9.7 | | | 110 |
| 25 | do | Ethomeen 18/12 | do | 5.8 | | | 35 |
| 26 | | | Octadecylamine | 1.8 | | | 300 |
| ANIONIC SULFONATES | | | | | | | |
| 27 | General Aniline & Film Corp | Igepon AC-78 | Coconut oil acid, esters of sodium isethionate. | | 9 | | 65 |
| 28 | do | Igepon TN-74 | Sodium N-methyl-N-palmitoyl taurate. | | 13 | | 175 |
| 29 | do | Igepon TE-42 | Sodium N-methyl-N-tallow acid taurate. | | 15 | | 180 |
| 30 | American Cyanamid | Aerosol OT | Dioctylester sodium sulfosuccinic acid. | | 12 | | 150 |
| 31 | Mona Ind. Inc | Monawet DC-70 | do | | 12 | | 140 |
| 32 | Calif. Chem | Ornite No. S | Alkylaryl sodium sulfonate | | 16 | | 300 |
| 33 | Monsanto Co | Santonerse D | do | | 10 | | 94 |
| 34 | | | Propylbenzene sodium sulfonate. | | 3 | | 300 |
| ANIONIC SULFATES | | | | | | | |
| 35 | E. I. du Pont de Nemours & Co | Dupanol C | Sodium lauryl sulfate | | 7 | | 150 |
| 36 | do | Dupanol L-144 | Sodium alkylaryl sulfate | | 10 | | 210 |
| 37 | | | Sodium propyl benzene sulfate | | 2 | | 300 |
| ANIONIC PHOSPHATES | | | | | | | |
| 38 | General Aniline & Film Corp | Gafac PE-510 | Free acid of a complex organic phosphate ester. | | 36 | | 135 |
| 39 | do | Gafac RE-610 | do | | 42 | | 180 |
| 40 | do | Gafac MC-470 | Sodium salt of a complex organic phosphate ester. | | 20 | | 72 |
| 41 | | | $NaO\overset{O}{\overset{\|}{P}}(OC_4H_9)_2$ | | 4 | | 300 |
| 42 | | | $NaO\overset{O}{\overset{\|}{P}}(OC_{26}H_{53})_2$ | | 50 | | 300 |
| ANIONIC MISCELLANEOUS | | | | | | | |
| 43 | | | Tall oil soap | | 16 | | 230 |
| 44 | Hercules Inc | Dresinate 731 | Sodium soap of a modified rosin | | 16 | | 300 |
| CATIONIC SURFACTANTS | | | | | | | |
| 45 | Nalco Chem | Nalquot G8-13 | Alkyl imidazoline derivative | | | 24 | 93 |
| 46 | do | Nalquot G9-13 | do | | | 19 | 160 |
| 47 | Armour Ind. Chem | Armac C | Acetic acid salts of the n-alkyl amines. | | | 5 | 300 |
| 48 | do | Arquad 18-50 | Quaternary ammonium chlorides | | | 17 | 200 |
| 49 | do | Arquad 2C-75 | do | | | 25 | 64 |
| 50 | do | Arquad 2HT | do | | | 35 | 100 |
| 51 | | | $[(C_{18}H_{37})_3NH]^+Cl^-$ | | | 51 | 300 | fonates tested in examples 27–34 as a function of the AFL factor of the surfactant;

FIG. 6 is a plot of the cumulative fluid loss for the aqueous dispersions containing various anionic surface active organo-sulfates tested in examples 35–37 as a function of the AFL factor of the surfactant;

FIG. 7 is a plot of the cumulative fluid loss for the aqueous dispersions containing various anionic surface active organo-phosphates tested in examples 38–42 as a function of the AFL factor of the surfactant; and FIG. 8 is a plot of the cumulative fluid loss for the aqueous dispersions containing various cationic surfactants tested in Examples 45–51 as a function of the CFL factor of the surfactant.

EXAMPLE 52

This example demonstrates the superiority of certain surfactants in improving the fluid loss properties of aqueous dispersions of solid hydrocarbon-polymer particles as compared with other surfactants having similar particle-dispersing capabilities.

Two aqueous dispersions are prepared by measuring the volume of 5 grams of the hydrocarbon-polymer particles employed in examples 2–51 and admixing these particles in 500 milliliters of water containing 0.25 gram of surfactant. One dispersion is prepared with a surface-active alkylphenoxypolyoxyethylene ethanol marketed by the Retzloff Chemical Company under the trademark Retzanol NP-100, and the other dispersion is prepared with a surface-active fatty acid amide marketed by the Onyx Chemical Company under the trademark Onyxol WW. The dispersions are stirred for 2 minutes and then allowed to remain quiescent for 2 minutes. At the end of the quiescent period the volume of the particles settled from the solution is measured and the percentage of particles remaining dispersed is calculated. The dispersions are again stirred and their cumulative fluid loss is determined in accordance with the method of examples 2–51.

It is observed that the fluid loss with the dispersion containing the surface-active fatty acid amide is less than one-half of that obtained with the dispersion employing the alkylphenoxyyethylene ethanol, even though both dispersions have the same dispersibility. The results of these tests are reported in table 3.

TABLE 3

| Surfactant | Dispersion, Vol. % | Cululative Fluid Loss (ml./5 min.) |
|---|---|---|
| Alkylphenoxypolyoxyethylene ethanol | 30 | 125 |
| Fatty acid amide | 30 | 57 |

EXAMPLE 53

A method for fracturing a subterranean oil-bearing formation employing the aqueous low loss fluid compositions of this invention is illustrated in this example. A well is drilled through the formation and cased to a depth below the producing zone with 7-inch steel casing. The casing is perforated with four 3/8-inch perforations per foot between the interval of 6,873 feet and 6,880 feet. Tubing is run into the well to a depth of 6,870 feet and a packer installed immediately above the terminus of the tubing.

The fracturing fluid is prepared by admixing 0.24 lbs. of a surface-active fatty acid amide marketed by the Onyx Chemical Company under the trademark Onyxol WW and 2.5 pounds of wax-polymer particles per gallon of fracturing fluid. The wax-polymer particles are homogenous solid solutions comprised of 90 percent paraffin wax melting between about 140° F. and 142° F. and 10 percent ethylene-vinyl acetate copolymer marketed by the E. I. DuPont Chemical Company under the trademark Elvax. Approximately 50 percent of the wax-polymer particles are minus 150 mesh U.S. Standard sieve in size, with the balance having a size within the range that will pass a number 8 and be retained on a number 150 U.S. Standard sieve.

The foregoing fracturing fluid composition is injected through the tubing and into the formation at a volume flow rate and pressure sufficient to fracture the formation. Fluid injection is continued to extend these fractures deep into the formation.

EXAMPLE 54

This example demonstrates the synergism between one of the preferred surfactants and the solid wax-polymer particles in ameliorating the fluid loss of an aqueous dispersion of the solid particles.

Four test fluids are prepared and their corresponding fluid properties measured in accordance with the method employed in examples 2–51. The first test fluid comprises 500 milliliters of water. The second fluid comprises a mixture of 500 milliliters of water of 0.25 gram of a surface-active fatty acid amide marketed by the Onyx Chemical Company under the trademark Onyxol WW. The third test fluid comprises an aqueous dispersion of 5 grams of the solid wax-polymer particles employed in examples 2–51 in 500 milliliters of water. The fourth test fluid comprises an aqueous dispersion of 5 grams of wax-polymer particles in 500 milliliters of water containing 0.25 gram of Onyxol WW.

It is observed that the fluid loss of ambient water is decreased by 5 percent with the addition of a surface-active fatty acid amide to the water and by 27 percent with the addition of hydrocarbon-polymer particles, while a decrease of 86 percent occurs with the addition of both the fatty acid amide and hydrocarbon-polymer particles. The results of these tests are reported in table 4.

TABLE 4

| Test Fluid | Composition | Fluid Loss (ml./5 min.) |
|---|---|---|
| 1 | Water | 410 |
| 2 | Water + Surfactant | 390 |
| 3 | Water + Particles | 300 |
| 4 | Water + Particles + Surfactant | 57 |

While particular embodiments of the invention have been described, it will be understood, of course, that the invention is not limited thereto since many modifications can be made, and it is intended to include within the invention any such modifications as fall within the scope of the claims.

The invention having thus been described, I claim:

1. A method of treating a permeable subterranean formation penetrated by a well which comprises injecting into the well a dispersion comprising from 0.1 to 60 weight percent of oil-soluble, water-insoluble, homogeneous solid particles comprised of petroleum wax in an aqueous liquid containing a surfactant in an amount of from about 0.0005 to 0.25 parts per part of solid particles and selected from the group consisting of nonionic surface-active ethers and thioethers having an HLB factor between about 8.5 and 19.5, nonionic surface-active esters having a HLB factor between about 10 and 14.5, surface-active amides having an HLB factor between about 7 and 10.5, nonionic surface-active amines having an HLB factor between about 4 and 10, anionic surface-active sulfonates having an AFL factor between about 7 and 12.5, anionic surface-active organo-sulfates having an AFL factor between about 5.5 and 7.5, anionic surface-active organo-phosphates having an AFL factor between about 12 and 39, cationic surface active agents having a CFL factor between about 19 and 38.

2. The method defined in claim 1 wherein said oil-soluble, water-insoluble solid particles are comprised of a solid solution of petroleum wax and polymer.

3. The method defined in claim 2 wherein said polymer is selected from the group consisting of (1) addition polymers of an olefin having between 2 and 4 carbon atoms, (2) copolymers of an olefin having between 2 and 4 carbon atoms and an alkyl acrylate containing not more than 4 carbon atoms in the alkyl group, (3) copolymers of an olefin having between 2 and 4 carbon atoms and an ester formed by the reaction of butenic acid and an alcohol having no more than 4 carbon atoms, and (4) copolymers of olefins having between 2 and 4 carbon atoms and an ester formed by the reaction of acetic acid and an unsaturated alcohol having no more than 4 carbon atoms.

4. The method defined in claim 2 wherein said polymer is selected from the group consisting of polyethylene, polypropylene, copolymer ethylene and methyl methacrylate, copolymer ethylene and vinyl acetate, and copolymer ethylene and ethyl acrylate.

5. The method defined in claim 2 wherein said petroleum wax is a paraffin wax.

6. The method defined in claim 1 wherein said aqueous liquid is selected from the group consisting of (1) water, (2) brine, (3) aqueous acid solutions, and (4) aqueous caustic solutions.

7. The method defined in claim 1 wherein said surfactant is (1) a condensation product of lauric or coconut fatty acids and diethanolamine, (a) an octlyphenoxy polyethoxy ethanol having a polyethoxy chain containing between about 15 and 35 mole equivalents of ethylene oxide, (3) a condensation product of stearamine of cocoamine and between about 2 and 4 mole equivalents of ethylene oxide, (4) a condensation product of coconut fatty acids and between about 4 and 6 mole equivalents of ethylene oxide, or (5) dilauryldimethyl ammonium chloride.

8. A method of completing a well drilled into a permeable subterranean formation which comprises circulating a low loss fluid from the formation surface to the drilling zone in said formation during the drilling operation and returning to the surface at least a portion of said fluid, said low loss fluid comprising a dispersion of oil-soluble, water-insoluble homogeneous solid particles comprised of petroleum wax in an aqueous liquid containing a surfactant selected from table 1.

9. The method defined in claim 8 wherein said solid particles are comprised of a solid solution of petroleum wax and polymer.

10. The method defined in claim 9 wherein said surfactant is (1) a condensation product of lauric acid or coconut fatty acids and diethanolamine, (2) an octylphenoxy polyethoxy ethanol having a polyethoxy chain containing between about 15 and 35 mole equivalents of ethylene oxide, (3) a condensation product of stearamine or cocoamine and between about 2 and 4 mole equivalents of ethylene oxide, (4) a condensation product of coconut fatty acids and between about 4 and 6 mole equivalents of ethylene oxide, or (5) dilauryldimethyl ammonium chloride.

11. A method of fracturing a permeable subterranean formation penetrated by a well which comprises injecting a low loss fluid into said well and into contact with said formation at a pressure and volume flow rate sufficient to fracture said formation, said low loss fluid comprising a dispersion of oil-soluble, water insoluble, homogeneous solid particles comprised of petroleum wax in an aqueous liquid containing a surfactant selected from table 1.

12. The method defined in claim 11 wherein said solid particles are comprised of a solid solution of petroleum wax and polymer.

13. The method defined in claim 11 wherein said surfactant is (1) a condensation product of lauric acid or coconut fatty acids and diethanolamine, (2) an octylphenoxy polyethoxy ethanol having a polyethoxy chain containing between about 15 and 35 mole equivalents of ethylene oxide, (3) a condensation product of stearamine or cocoamine and between about 2 and 4 mole equivalents of ethylene oxide, (4) a condensation product of coconut fatty acids and between about 4 and 6 mole equivalents of of ethylene oxide, or (5) dilauryldimethyl ammonium chloride.

14. A method of treating a permeable subterranean formation penetrated by a well which comprises injecting into the well a dispersion of up to about 60 weight percent of oil-soluble, water-insoluble homogeneous solid particles comprised of petroleum wax and polymer in an aqueous solution containing 0.01 to 25 weight percent based upon the weight of said solid particles of a surfactant selected from the group consisting of (1) a condensation product of lauric acid or coconut fatty acids and diethanolamine, (2) an octylphenoxy polyethoxy ethanol having a polyethoxy chain containing between about 15 and 35 mole equivalents of ethylene oxide, (3) a condensation product of stearamine or cocoamine and between about 2 and 4 mole equivalents of ethylene oxide, (4) a condensation product of coconut fatty acids and between about 4 and 6 mole equivalents of ethylene oxide, or (5) dilauryldimethyl ammonium chloride.

15. The method defined in claim 14 wherein said surfactant is a condensation product of coconut fatty acids and between about 4 and 6 mole equivalents of ethylene oxide.

16. A low loss fluid composition comprising in admixture (1) an aqueous liquid, (2) from 0.1 to 60 weight percent of oil-soluble, water-insoluble homogeneous solid particles having a means diameter of from about one-half inch to about 1 micron and comprised of petroleum wax, and (3) a surfactant in an amount of from about 0.0005 to 0.25 parts per part of solid particles and selected from the group consisting of nonionic surface active ethers and thioethers having an HLB factor between about 8.5 and 19.5, nonionic surface-active esters having an HLB factor between about 10 and 14.5, nonionic surface-active amides having an HLB factor between about 7 and 10.5, nonionic surface-active amines having an HLB factor between about 4 and 10, anionic surface-active sulfonates having an AFL factor between 7 and 12.5, surface-active organo-sulfates having an AFL factor between about 5.5 and 7.5, surface-active organo-phosphates having an AFL factor between about 12 and 39, and cationic surface-active agents having a CFL factor between about 19 and 38.

17. The composition defined in claim 16 wherein said oil-soluble, water-insoluble solid particles are comprised of a solid solution of petroleum wax and polymer.

18. The composition defined in claim 17 wherein said polymer is selected from the group consisting of (1) addition polymers of an olefin having between 2 and 4 carbon atoms, (2) copolymers of an olefin having between 2 and 4 carbon atoms and an alkyl acrylate containing not more than 4 carbon atoms in the alkyl group, (3) copolymers of an olefin having between 2 and 4 carbon atoms and an ester formed by the reaction of butenic acid and an alcohol having no more than 4 carbon atoms, and (4) copolymers of olefins having between 2 and 4 carbons atoms and an ester formed by the reaction of acetic acid and an unsaturated alcohol having no more than 4 carbon atoms.

19. The composition defined in claim 17 wherein said polymer is selected from the group consisting of polyethylene, polypropylene, copolymer ethylene and methyl methacrylate, copolymer ethylene and vinyl acetate, and copolymer ethylene and ethyl acrylate.

20. The composition defined in claim 16 wherein said aqueous liquid is selected from the group consisting of (1) water, (2) brine, (3) aqueous acid solutions, and (4) aqueous caustic solutions.

21. The composition defined in claim 16 wherein said surfactant is (1) a condensation product of lauric acid or coconut fatty acids and diethanolamine, (2) an octylphenoxy polyethoxy ethanol having a polyethoxy chain containing between about 15 and 35 mole equivalents of ethylene oxide, (3) a condensation product of stearamine or cocoamine and between about 2 and 4 mole equivalents of ethylene oxide, (4) a condensation product of coconut fatty acids and between about 4 and 6 mole equivalents of ethylene oxide, or (5) dilauryldimethyl ammonium chloride.

22. A low loss fluid composition comprising a dispersion of up to about 60 weight percent of oil-soluble, water-insoluble solid particles comprised of a homogenous solid solution of petroleum wax and a polymer selected from the group consisting of polyethylene, polypropylene, copolymer ethylene and methyl methacrylate, copolymer ethylene and vinyl acetate, and copolymer ethylene and ethyl acrylate in an aqueous solution containing 0.01 to 25 weight percent based upon the weight of said solid particles of a surfactant selected from the group consisting of (1) a condensation product of lauric acid or coconut fatty acids and diethanolamine, (2) an octylphenoxy polyethoxy ethanol having a polyethoxy chain containing between about 15 and 35 mole equivalents of ethylene oxide, (3) a condensation product of stearamine or cocoamine and between about 2 and 4 mole equivalents of ethylene oxide, (4) a condensation product of coconut fatty acids and between about 4 and 6 mole equivalents of ethylene oxide, or (5) dilauryldimethyl ammonium chloride.

23. The composition defined in claim 22 wherein said surfactant is a condensation product of coconut fatty acids and between about 4 6 mole equivalents of ethylene oxide.